United States Patent [19]

Trubert

[11] Patent Number: 4,760,953
[45] Date of Patent: Aug. 2, 1988

[54] THERMOSTATIC MIXER DEVICES IN PARTICULAR FOR DISTRIBUTING WATER

[75] Inventor: Denis Trubert, Viroflay, France

[73] Assignee: Societe des Etablissements Rene Trubert, Viroflay, France

[21] Appl. No.: 83,286

[22] Filed: Aug. 10, 1987

[30] Foreign Application Priority Data

Aug. 11, 1986 [FR] France ............................... 86 11587

[51] Int. Cl.⁴ ........................................... G05D 23/13
[52] U.S. Cl. .................................... 236/122; 137/607
[58] Field of Search ................. 236/12.2; 137/607, 853

[56] References Cited

U.S. PATENT DOCUMENTS

| 2,657,859 | 11/1953 | Von Wangenheim | 236/12 |
|---|---|---|---|
| 2,792,178 | 5/1957 | Littleton | 236/12 |
| 3,004,710 | 10/1961 | Couffer, Jr. et al. | 236/12.2 |
| 3,045,696 | 7/1962 | Cobb et al. | 137/606 |
| 3,384,113 | 5/1968 | Penvisi | 137/853 |
| 4,029,256 | 6/1977 | Dauga | 236/12.2 |
| 4,171,007 | 10/1979 | Boutielle | 137/853 X |
| 4,217,921 | 8/1980 | Gidner | 137/853 X |
| 4,582,081 | 4/1986 | Fillman | 137/853 X |

FOREIGN PATENT DOCUMENTS 2174135 10/1973 France .
2295327 7/1974 France .

Primary Examiner—William E. Tapolcai
Attorney, Agent, or Firm—Fleit, Jacobson, Cohn & Price

[57] ABSTRACT

A fluid mixer device comprising a body (110) having an internal chamber (112) into which there open out at least one hot fluid inlet orifice (116), at least one cold fluid inlet orifice (117), and at least one outlet orifice (124) for the mixture of hot and cold fluids, a slide (150) being received in the chamber (112) and defining, in co-operation with the body (110), a hot fluid passage connected to the hot fluid inlet orifice, and a cold fluid passage connected to the cold fluid inlet orifice, and a thermal expansion element (130) fixed to the slide (150) and suitable for displacing the slide (150) within the chamber (112) in order to modify the ratio of the free fluid flow sections in order to maintain the outlet mixture at a predetermined temperature. According to the invention, the mixer device includes, inside the chamber (112), non-return valve-forming elements (200, 210) of flexible material which rest resiliently against seats provided on the inside surface of the chamber (112) overlying the periphery of the hot fluid inlet orifice (116) and of the cold fluid inlet orifice (117).

7 Claims, 2 Drawing Sheets

FIG_1
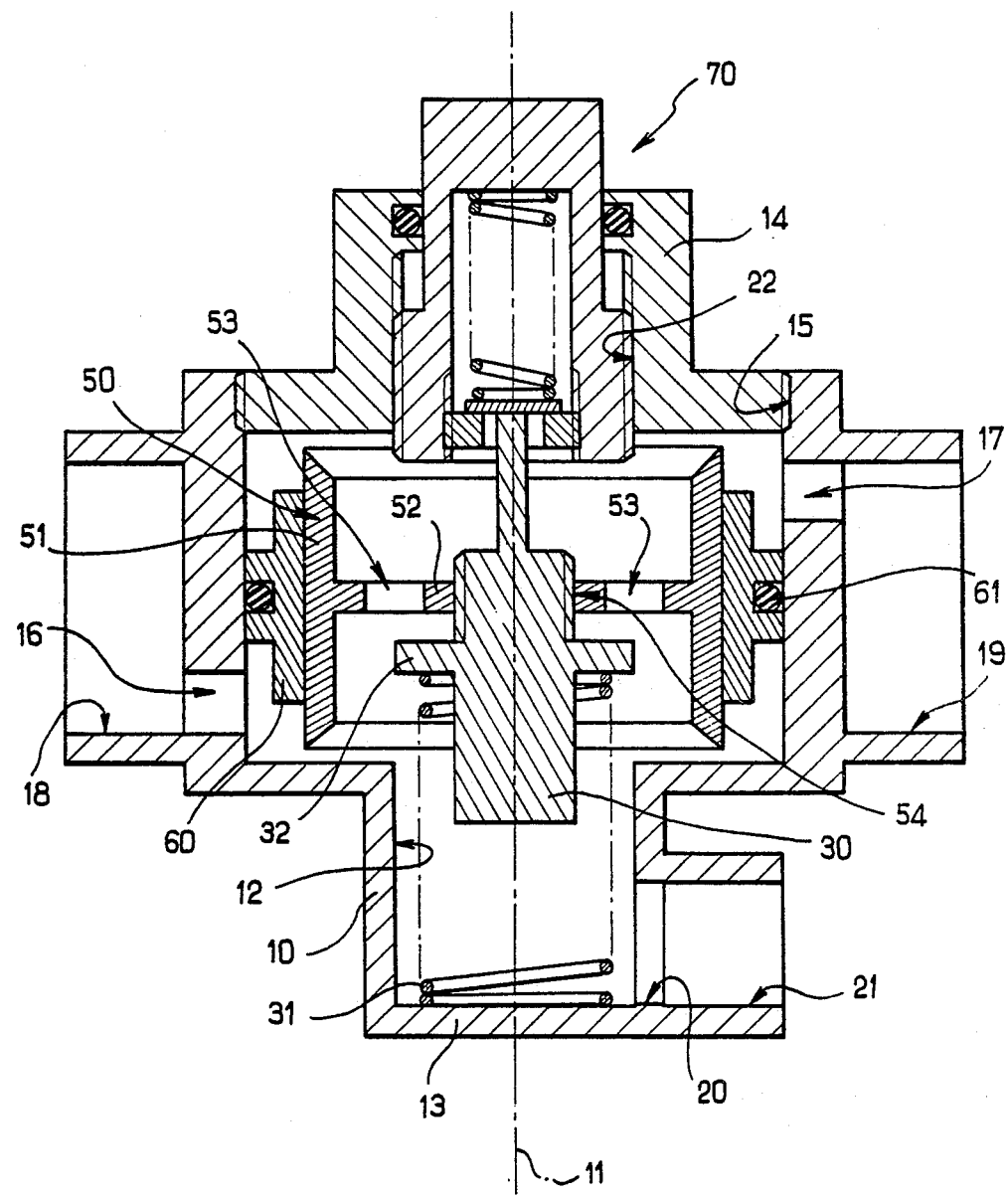

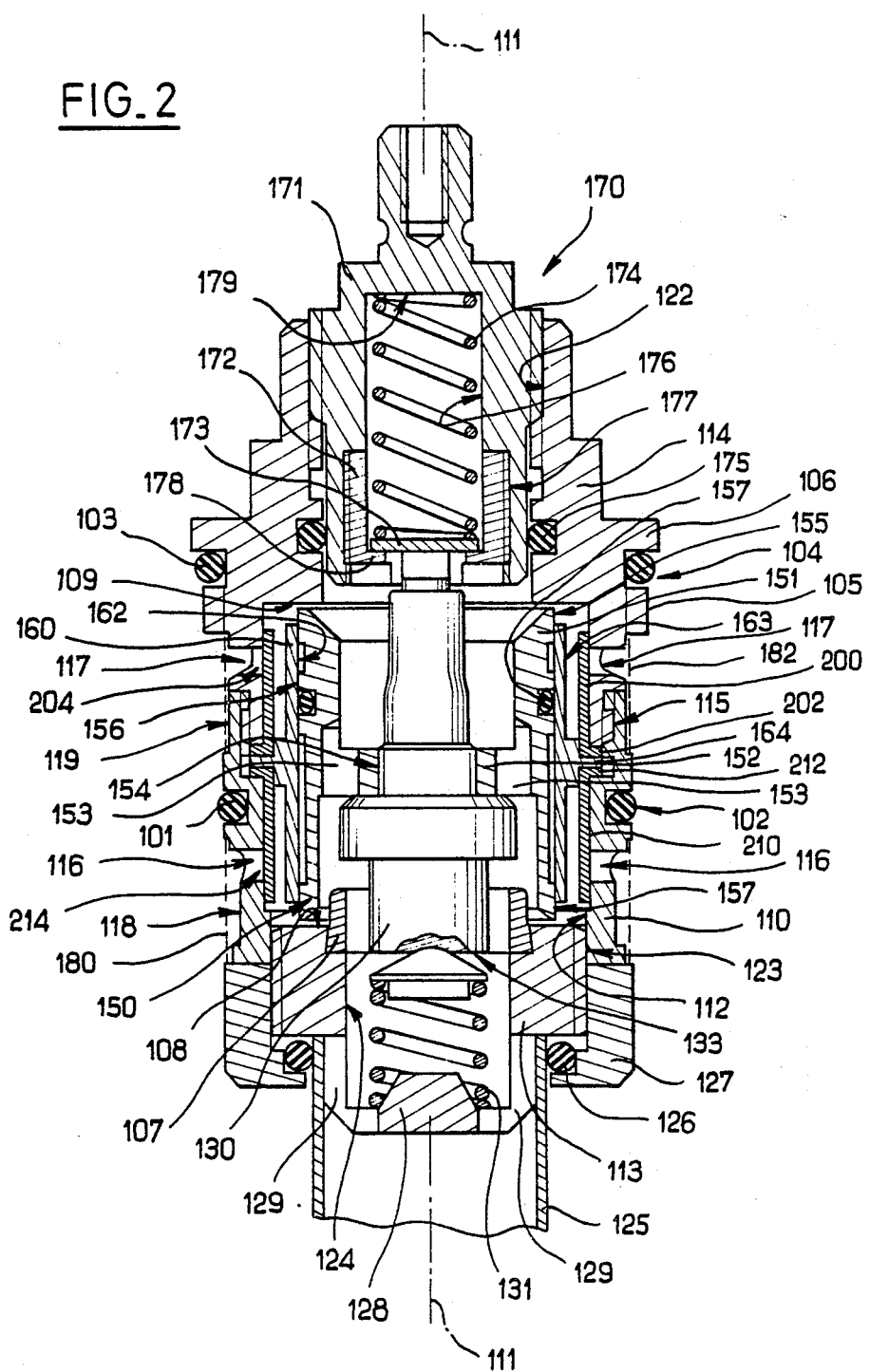

THERMOSTATIC MIXER DEVICES IN PARTICULAR FOR DISTRIBUTING WATER

The present invention relates to devices for mixing a cold fluid and a hot fluid, in particular hot water and cold water, the device including a thermostatic element suitable for regulating the temperature of the fluid mixture obtained.

BACKGROUND OF THE INVENTION

Numerous mixer devices of the above-mentioned type including a thermostatic element have already been proposed.

Such mixer devices are described and shown in patent documents FR-A No. 2 174 134 and FR-A No. 2 295 327, for example.

Accompanying FIG. 1 is a diagram of a conventional mixer device including a thermostatic element, in accordance with the description of patent document FR-A No. 2 174 134.

The mixer device shown in FIG. 1 comprises: a body 10; a thermal expansion element 30; and a slide 50 fixed to said element.

The body 10 defines an internal chamber 12 which is generally circularly cylindrical about an axis 11. The chamber 12 is closed axially at one end by the bottom 13 of the body and at its other end by a cap 14 which is screwed onto the body at 15.

The body 10 has a first radial inlet orifice 16 and a second radial inlet orifice 17 which connect the internal chamber 12 respectively to a hot water inlet connection 18 and to a cold water inlet connection 19.

The radial orifices 16 and 17 are spaced apart axially.

The body 10 also has an outlet orifice 20 which connects the internal chamber 12 to an outlet connection 21 via which the fluid mixture is evacuated.

The thermal expansion element 30 is received in the chamber 12 coaxially about the axis 11. It is resiliently biassed by a spring 31 to press against a temperature adjustment member 70 carried by the cap 14. The spring 31 is inserted between the bottom 13 of the body and an outwardly projecting collar 32 on the element 30.

The slide 50 comprises a plate 52 and a sleeve 51 which is coaxial about the axis 11. The plate is located inside the sleeve 51 to which it is fixed, and extends transversely to the axis 11. The plate 52 is perforated at 53 to allow fluid to pass therethrough. The plate 52 is in addition screwed, at 54, onto the element 30 in order to follow the axial displacements thereof due to thermal expansion.

The outer surface of the sleeve 51 rests against a bush 60 which is coaxial with the axis 11. The outer surface of the bush 60 rests in turn via a sealing ring 61 against the inside surface of the chamber 12, between the radial inlet orifices 16 and 17 in order to separate them.

The temperature adjustment member 70 serves to adjust the axial position of the temperature expansion element 30 and of the slide 50, thereby disengaging the radial inlet orifices 16 and 17 in proportion to the flow rates of hot fluid and cold fluid that are required to obtain the desired outlet temperature.

If there are fluctuations in the flow rates or the temperatures of the hot and cold fluids, the thermal expansion element 30 changes the ratio between the free cross-sections of the inlet orifices 16 and 17 so as to modify the proportions of the mixture in order to maintain the desired temperature in the outlet mixture.

Patent document U.S. Pat. No. 2,657,859 describes a generally similar mixer device. The device described in document U.S. Pat. No. 2,657,859 additionally includes two annular elements which are urged to press against the slide via pressure washers. The annular elements are thus urged in a direction suitable for opening the hot and cold fluid passages.

Mixer devices of the type illustrated in accompanying FIG. 1 as described above have given good service.

However, the Applicant has observed that such prior mixer devices suffer from a serious drawback due to the fact that they do not prevent hot fluid from flowing through the body of the mixter from the hot water inlet connection 18 to the cold water inlet connection 19 and likewise do not prevent cold fluid from flowing from the cold water inlet connection 19 to the hot water inlet connection 18.

Proposals have indeed already been made to associate thermostatic mixer devices with non-return valves in order to limit the above drawback.

However, present attempts at adding non-return valves to mixer devices have not given full satisfaction. Proposals have thus been made to place a non-return valve in each of the hot and cold water inlet ducts, upstream from the connections provided on the mixer body. However, this solution is expensive and unsightly. Further, it considerably complicates the operations of installation and maintenance.

Proposals have also been made to place non-return valves level with the hot and cold water inlet connections at the ends of connection tubes connected to the body of the mixer device. However, in this case the connections are not always accessible and maintenance becomes impossible.

Finally, proposals have also been made to place non-return valves in the body of the mixer device level with the hot and cold water inlet connections. They are then readily accessible and maintenance operations are easy. However, this construction gives rise to bulky apparatuses which are unsightly and expensive.

The present invention now seeks to provide a new mixer device including a thermostatic element and suitable for preventing any hot or cold water from reaching the cold or hot water inlet connections, respectively, while still being simple, reliable, and cheap to implement.

SUMMARY OF THE INVENTION

According to the present invention, this is achieved by a mixer device of a type known per se comprising a body having an internal chamber into which there open out at least one hot fluid inlet orifice, at least one cold fluid inlet orifice, and at least one outlet orifice for the mixture of hot and cold fluids, a slide being received in the chamber and defining, in co-operation with the body, a hot fluid passage connected to the hot fluid inlet orifice, and a cold fluid passage connected to the cold fluid inlet orifice, and a thermal expansion element fixed to the slide and suitable for displacing the slide within the chamber in order to modify the ratio of the free fluid flow sections in order to maintain the outlet mixture at a predetermined temperature, the mixer device being characterized by the fact that it includes, inside the chamber, non-return valve-forming elements of flexible material which rest resiliently against seats provided on the inside surface of the chamber overlying the periphery of the hot fluid inlet orifice and of the cold fluid inlet orifice.

Preferably, the elements made of flexible material are in the form of sleeves, preferably made of elastomer, and placed between the inside surface of the chamber and a bush serving as a bearing surface for the slide.

Thus, in accordance with the present invention, two sleeves are preferably provided which are each clamped at one of their ends between the body of the mixer and the bush serving as a bearing surface for the slide, while still being capable of moving at their opposite ends which are placed respectively opposite the hot fluid inlet orifice and opposite the cold fluid inlet orifice.

BRIEF DESCRIPTION OF THE DRAWINGS

An embodiment of the invention is described by way of example with reference to the accompanying drawings, in which:

FIG. 1 shows the prior art as described above; and

FIG. 2 is a diagrammatic axial section view through a mixer device with a thermostatic element and in accordance with the present invention.

MORE DETAILED DESCRIPTION

FIG. 2 shows a body 110, a thermal expansion element 130, and a slide 150 fixed on the thermal expansion element.

In general, the mixer device in accordance with the present invention is circularly symmetrical about an axis referenced 111.

The body 110 is generally in the form of a cylindrical wall which delimits an internal chamber 112 which is in the general form of a circular cylinder about the axis 111. The chamber 112 is axially delimited at one end by a ring 113 having an outside thread which is screwed at 123 into the body 110, and at its opposite end by a cap 114 which is screwed at 115 onto the body 110.

The outside surface of the body 110 has two annular grooves 118 and 119. These annular grooves 118 and 119 are spaced apart axially. They are intended to be connected respectively to a hot water inlet duct and to a cold water inlet duct.

A first series of orifices 116 pass through the body 110 in a radial direction relative to the axis 111 and connect the annular groove 118 to the internal chamber 112.

A second series of orifices 117 pass through the wall of the body 110 radially relative to the axis 111 and connect the second annular groove 119 to the internal chamber 112.

The ring 113 has a bore 124 passing therethrough to constitute the outlet orifice from the mixer. In the example shown in FIG. 2, this outlet orifice 124 opens out into a duct 125 which is coaxial with the axis 111. A sealing ring 126 is interposed between the outside surface of the duct 125 and an auxiliary nut 127 screwed onto the ring 113.

The thermal expansion element 130 is received in the chamber 112 coaxially with the axis 111. It is urged against a temperature adjusting member 170 on the cap 114 by a spring 131. The spring is inserted between a core 128 which is fixed to the ring 113 and which is centered on the axis 111, and that face 133 of the thermostatic element 130 which extends transversely to the axis 111 and which faces away from the cap 114. The core 128 is connected to the ring 113 via radial fins 129 between which the fluid mixture can flow from the outlet orifice 124 towards the outlet duct 125.

The slide 150 comprises a sleeve 151 which is coaxial with the axis 111 and a plate 152.

The plate is placed inside the sleeve 151 and is fixed thereto where it extends transversely to the axis 111. The plate 152 is perforated axially at 153 in order to pass fluid.

The plate 152 is also fixed by a thread at 154 onto the thermostatic element 130 in order to follow displacements thereof due to thermal expansion.

The outside surface of the sleeve 151 defined by a circularly cylindrical envelope about the axis 111 rests against the inside surface 162 (which is likewise circularly cylindrical about the axis 111) of a bush 160 which is coaxial with the axis 111.

The bush 160 has an outwardly directed annular rib 164 projecting from substantially halfway along its outside surface 163, said rib being clamped during assembly between bearing surfaces extending transversely to the axis 111 and defined respectively on the cap 114 and the body 110, level with the thread where these two items engage each other and given the general reference 115.

Further, as mentioned above, the mixer device in accordance with the present invention and as shown in FIG. 2 includes two sleeves of flexible material 200 and 210 constituting non-return valves.

These sleeves 200 and 210 are placed in the chamber 112. They rest resiliently against seats provided on the inside surface of the chamber 112, respectively on the body 110 and on the cap 114, thereby overlying the peripheries of the hot fluid inlet orifices 116 and of the cold fluid inlet orifices 117.

The sleeves of flexible material 200 and 210 are preferably made of elastomer rubber.

The sleeves 200 and 210 are coaxial about the axis 111 and are preferably provided at one of their ends with an outwardly projecting annular flange 202 or 212, as the case may be. These flanges 202 and 212 are clamped respectively between the cap 114 and the rib 164 which is fixed to the bush 160, and between the same rib 164 and the body 110.

Thus, the elastomer sleeves 200 and 210 make it possible to obtain proper sealing between the cap 114 and the body 110 during assembly.

Further, by virtue of the flanges 202 and 212 clamped between the body 110 and the cap 114, the non-return valve-forming sleeves 200 and 210 are securely held in an axial position such that their opposite ends 204 and 214 furthest from the flanges 202 and 212 are free to move and overlie the inlet orifices 117 and the inlet orifices 116 respectively when in their rest positions.

In the embodiment shown in FIG. 2, the cylindrical outer surface of the slide 151 rests against the inner surface of the bush 160 at three annular bearing surfaces 155, 156 and 157.

The bearing surfaces 155 and 157 are defined at the axial ends of the slide 150. The bearing surface 156 is defined substantially axially halfway along the outside surface of the slide 151. The middle bearing surface 156 carries a sealing ring 157 which rests against the inside surface of the bush 160.

In co-operation with the cap's surface 109 which extends transversely and which faces the chamber 112, the bearing surface 155 defines an annular cold fluid passage connected to the cold fluid inlet orifices 117 when the sleeve 200 is lifted off the associated seat.

Symmetrically, in co-operation with the ring's surface 108 which extends transversely to the axis 111 and which faces the chamber 112, the bearing surface 157 defines an annular hot fluid passage connected to the hot fluid inlet orifices 116 when the sleeve 210 is lifted from its associated seat.

It may be observed that the ring 113 carries an annular deflector 107 which is coaxial with the axis 111 and which projects into the internal chamber 112. The deflector 107 is placed facing the hot fluid passage defined between the bearing surface 157 and the ring surface 108 in order to prevent hot fluid from directly reaching the outlet orifice 124 and consequently in order to obtain intimate mixing of the hot and cold fluids on the periphery of the thermal expansion member 130.

The temperature adjusting member 170 as shown in accompanying FIG. 2 comprises a threaded plug 171, a ring 172, a washer 173, and a spring 174.

The threaded plug 171 is screwed into a tapped bore 122 provided through the cap 114 and coaxially with the axis 111. A sealing ring 175 is interposed between the threaded plug 171 and the cap 114 inside the threads 122 to prevent any fluid escaping therebetween.

The threaded plug 171 has a blind internal chamber 176. This chamber is generally circularly cylindrical about the axis 111 and opens out into the chamber 112 of the body.

This chamber 176 is tapped at 177 level with its opening. The ring 172 has an external thread and is screwed into the tapped thread 177. The ring 172 is additionally provided on its internal periphery with a projecting lip 178. The lip provides an axial bearing surface for the washer 173 which is larger in diameter.

More precisely, the washer 173 which serves as a bearing surface for the thermal expansion element 130 is interposed between the closed end 179 of the chamber 176 and the lip 178 on the ring 172. Further, the spring 174 is interposed between the closed end 179 of the chamber 176 and the washer 173 in order to urge the washer to press against the lip 178.

The mixer device including a thermostatic element in accordance with the present invention and as shown in FIG. 2 is provided in the form of a unit cartridge suitable for being received in the housing of a mixer faucet. To do this, the nut 127 has an outside diameter which is substantially equal to the outside diameter of the body 110. The diameter of the nut 127 which corresponds substantially to the diameter of the body 110 is, in addition, less than the largest diameter portion 106 of the cap 114. This largest diameter portion 106 of the cap 114 has an outside thread 105 for enabling the cartridge constituted by the mixer device in accordance with the present invention to be fixed into the housing of a mixer faucet as mentioned above. This largest diameter portion 106 of the cap 114 is in addition provided with an annular groove 104 which receives a sealing ring 103.

Thus, when assembled in the housing of a mixer faucet, the annular groove 118 is placed facing hot water inlet duct while the groove 119 is placed facing a cold water inlet duct. In order to avoid any direct passage of fluid from the cold water inlet duct to the hot water inlet duct, or vice versa, the body 110 has an annular groove 102 in its outer periphery receiving a sealing ring 101. In use, the sealing ring 101 separates the hot water inlet duct from the cold water inlet duct which are located facing respective ones of the annular grooves 118 and 119.

It may also be observed in accompanying FIG. 2 that filters 180 and 182 are provided in the annular grooves 118 and 119, respectively.

These filters 180 and 182 are preferably in the form of meshes folded to form cylindrical sleeves coaxially about the axis 111.

The operation of the mixer device having a thermostatic element in accordance with the present invention is now described.

At rest, the flexible sleeves 200 and 210 rest against the inside surface of the chamber 112 and close the hot water inlet orifices 116 and the cold water inlet orifices 117.

The thermal expansion element 130 is pressed against the washer 173 by the spring 131.

By screwing the plug 171 into the tapped bore 122 of the cap 114, the bearing washer 173 is displaced, thereby adjusting the axial position of the thermal expansion element 130 and of the slide 150. It is therefore possible, by acting on the plug 171, to open the annular passages defined between the axial ends of the slide 150 and the transverse surfaces 108 and 109 respectively in proportion to the required hot and cold fluid flow rates in order to obtain the desired outlet temperature.

In the event of subsequent fluctuations either in the flow rates or in the temperatures of the hot or the cold fluids, the thermal expansion element 130 changes the ratio between the above-mentioned free flow passage areas in such a manner as to change the proportions in the mixture and thus maintain the desired temperature for the outlet mixture.

The spring 174 avoids overloading the thermostatic element 130.

Naturally, when the outlet from the mixer device is open, the flows of hot and cold water coming from the respective hot and cold inlet ducts lift the flexible sleeves 200 and 210 off their respective seats. These flexible sleeves 200 and 210 are returned resiliently against the inside surface of the chamber 112 when the outlet flow from the device is turned off. Preferably, the bush 160 is made of plastic material. The bush 160 thus serves as an anti-friction lining for the slide 150. It is also relatively little subject to hard water deposit.

It may also be observed that when the flexible sleeves 200 and 210 are lifted off their respective seats, they serve to deflect the hot and cold water flows arriving at the orifices 116 and 117 so as to direct these flows towards the passages defined between the axial ends of the slide 150 and the transverse surfaces 108 and 109. Thus, by virtue of the flexible sleeves 200 and 210 acting as deflectors, the flows of water from the orifices 116 and 117 do not exert excessive forces on the bush 160. Such forces could otherwise damage the bush 160 or interfere with the sliding of the slide 150 therein, thereby causing the device to operate poorly.

In other words, in addition to their non-return valve function, the sleeves 200 and 210 act as deflectors for the flows of water coming from the orifices 116 and 117, and as a result a thin bush 160 can be used which is suitable for fitting closely to the slide 150 in order to guide it accurately.

Naturally, the present invention is not limited to the particular embodiment described above but extends to any variant that falls within its scope.

It may be observed that the structure in accordance with the present invention makes maintenance operations simple and easy. An operator can easily act on the mixer device, including its non-return valve-forming elements 200 and 210, its slide 150, the thermal expansion element 130, or the filters 180 and 182.

I claim:

1. A fluid mixer device comprising a body having:
   an internal chamber into which there open out at least one hot fluid inlet orifice, at least one cold fluid inlet orifice, and at least one outlet orifice for the mixture of hot and cold fluids;
   a slide received in the chamber and defining, in cooperation, with the body, a hot fluid passage in communication with the hot fluid inlet orifice, and a cold fluid passage in communication with the cold fluid inlet orifice;
   a thermal expansion element fixed to the slide and suitable for displacing the slide within the chamber in order to modify the ratio of the free flow sections of said hot and cold fluid passages in order to maintain the outlet mixture at a predetermined temperature;
   a bush of flexible material located in the chamber serving as a bearing surface for the slide; and
   two non-return valve-forming sleeves, each of which is clamped at one of its axial ends between the body and said bush serving as a bearing surface for the slide, while still being free to move at its opposite axial end which, when at rest, overlies resiliently one of the fluid inlet orifices.

2. A mixer device according to claim 1, wherein the non-return valve-forming sleeves are made of elastomer rubber.

3. A mixer device according to claim 1, wherein said bush serving as a bearing surface for the slide is made of plastic material.

4. A mixer device according to claim 1, wherein the slide rests on the inside cylindrical surface of the bush.

5. A mixer device according to claim 1, wherein the body possesses two outer annular grooves and two series of orifices passing therethrough for connecting a respective one of the grooves with the internal chamber.

6. A mixer device according to claim 5, wherein filters in the form of sleeves are placed in the annular grooves.

7. A fluid mixer device comprising a body having:
   a generally circularly cylindrical internal chamber into which there open out at least one hot fluid inlet radial orifice, at least one cold fluid inlet radial orifice, and an outlet orifice for the fluid mixture;
   two sleeves of elastomer material received in the chamber,
   a bush of plastic material received in the chamber over the inside of the sleeves, the bush having an outwardly projecting annular rib on its outside surface such that one of the axial ends of each of the sleeves is clamped between the rib fixed to the bush and the body, while the opposite axial end of each sleeve rests resiliently against seats provided on the inside surface of the chamber overlying the peripheries of the hot fluid inlet orifice and of the cold fluid inlet orifice respectively;
   a slide in the form of a cylindrical sleeve slidably mounted over the inside surface of the bush, the slide cooperating with the body to define a hot fluid passage communicating with the hot fluid inlet orifice and a cold fluid passage communicating with the cold fluid inlet orifice; and
   a thermal expansion element fixed to the slide and suitable for displacing the slide inside the chamber in order to modify the ratio between the free fluid flow sections of said fluid passages in order to maintain the outlet mixture at a predetermined temperature.

* * * * *